(12) United States Patent
Boulard et al.

(10) Patent No.: US 7,896,964 B2
(45) Date of Patent: Mar. 1, 2011

(54) CEMENT RETARDER

(75) Inventors: Stephane Boulard, Choisy le roi (FR); Jesse Lee, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 657 days.

(21) Appl. No.: 11/965,319

(22) Filed: Dec. 27, 2007

(65) Prior Publication Data
US 2008/0156231 A1    Jul. 3, 2008

(30) Foreign Application Priority Data
Dec. 28, 2006    (EP) .................................. 06292073

(51) Int. Cl.
*C04B 24/04* (2006.01)
(52) U.S. Cl. .................. 106/728; 106/823; 166/293
(58) Field of Classification Search ................. 106/728, 106/823; 166/293
See application file for complete search history.

(56) References Cited

U.S. PATENT DOCUMENTS

| | | |
|---|---|---|
| 5,447,197 A | 9/1995 | Rae et al. |
| 5,547,506 A | 8/1996 | Rae et al. |
| 6,173,778 B1 | 1/2001 | Rae et al. |
| 6,613,142 B1 | 9/2003 | Di Lullo Arias et al. |
| 6,907,928 B2 | 6/2005 | Di Lullo Arias et al. |

*Primary Examiner*—Paul Marcantoni
(74) *Attorney, Agent, or Firm*—David Cate; Robin Nava; Matthias Abrell

(57) ABSTRACT

The invention provides a cementitious composition for oilfield application comprising an organic retarder having at least one carboxylate group and copper ions such that a complex is made between copper ion and carboxylate group. Also a method to retard cementitious composition for oilfield application is disclosed, the method comprising the unique double step of adding an organic retarder having at least one carboxylate group and adding copper ions such that a complex is made between copper ion and carboxylate group.

4 Claims, 3 Drawing Sheets

CEMENT RETARDER

CROSS REFERENCE TO RELATED APPLICATIONS

This application claims priority to European patent application 06292073.1 filed Dec. 28, 2006.

FIELD OF THE INVENTION

The present invention broadly relates to well cementing. More particularly the invention relates to a composition and method to retard cement setting used in wells from a subterranean reservoir, such as for instance an oil and gas reservoir or a water reservoir.

DESCRIPTION OF THE PRIOR ART

Hydraulic cements are cements that set and develop compressive strength due to a hydration reaction, and thus can be set under water. As such, hydraulic cements are often used for cementing pipes or casings within a well bore of a subterranean formation for the construction of oil, gas and water wells, as well as other purposes, such as squeeze cementing. In the oil and gas industry, successful cementing of well pipe and casing during oil and gas well completion requires cement slurries having several important properties. The cement slurry must have a pumpable viscosity, fluid loss control, minimized settling of particles and the ability to set within a practical time. In a typical completion operation, the cement slurry is pumped down the inside of the pipe or casing and back up the outside of the pipe or casing through the annular space. This seals the subterranean zones in the formation and supports the casing. Conventional mixing equipment for such applications is relatively complex and expensive. The equipment must wet dry cement powder, homogenize the mix, measure its density and, if necessary, recirculate it, such that additional solids or mixwater can be added to achieve the desired density. These varied requirements dictate the equipment's configuration and complexity. Bulk equipment is usually pressurized so that solids can be transferred pneumatically at the relatively high rates required. Once at the drilling site, the pneumatically conveyed cementing solids must be correctly proportioned and mixed with the water, as well as other additives to form a pumpable slurry. The slurry must then be tested for the appropriate density, with the density adjusted to fall within the appropriate range. If cementing solids are not correctly proportioned, the quality of the cement diminishes.

Storable cementitious slurries that remain liquid over an extended period of time and which can be activated at the time of use to meet specific job requirements are known. Such slurries contain, in addition to the cementitious slurry, a set retarder and a suspending agent. Also known are carrageenan suspending agent to provide a slurry under conditions of high pH and calcium ion content. Also disclosed is used of a storable cementitious slurry where the suspending agent is iota carragean as well as poly (methyl vinyl ether/maleic anhydride) decadiene copolymer and where the amount of boric acid is from 1 to 6 percent by weight. In this cementitious slurry boric acid is sufficient to lower the pH of the storable cementitious slurry to at least 12.0. Further disclosed are cementitious compositions which comprise blast-furnace slag besides other additives which are usual in the cementing technique. The compositions and slurries are insufficiently activated (or are activated immediately before introducing them into the well), so that they can be stored for at least 72 hours (alternatively they may be stored indefinitely) without the setting of the composition and dispense with the addition of activation inhibitors.

Such cementitious slurries offer several advantages over the conventional cementing slurries of the prior art. Most notably, they are made in advance and stored until needed, thereby allowing the production of such slurries regardless if drilling has commenced. In addition, the storable cement slurry may be made at a different location from the job site. This storable slurry can then be transported to the job site before cementing. Further, the slurry can be stored in non-pressurized tanks and easily transferred. Still further, the mixing equipment used on the job site need only homogenize the slurry with any additional water and additives as required en route to the down hole pumps; activators may be added, mix water proportioned and additives introduced on-site to control the slurry's properties. Such storable slurries can further undergo quality control prior to introduction into the well. In addition, the need for sophisticated density control equipment is eliminated, thereby reducing the capital investment requirement for cementing equipment.

It is proposed herewith a new set retarder useful for storable cement and compatible with storable cement from prior art, which provides enhanced properties in term of storability.

SUMMARY OF THE INVENTION

According to one aspect of the invention, the invention provides a cementitious composition for oilfield application comprising an organic retarder having at least one carboxylate group and copper ions such that a complex is made between copper ion and carboxylate group. Preferably, the copper ions are copper (II) ions. More preferably, the organic retarder is anyone of component taken in the list constituted of: gluconate, glucoheptonate, Ethylene Diamine Tetraacetic acid (EDTA) or Ethylene Diamine Tetramethylene Phosphonate (EDTMP) and a combination thereof.

In a further aspect it is proposed to use precedent cementitious composition for storable cement.

According to another aspect of the invention, a method to retard cementitious composition for oilfield application is disclosed, the method comprising the unique double step of adding an organic retarder having at least one carboxylate group and adding copper ions such that a complex is made between copper ion and carboxylate group. Preferably, the copper ions are copper (II) ions. More preferably, the organic retarder is anyone of component taken in the list constituted of: gluconate, glucoheptonate, Ethylene Diamine Tetraacetic acid (EDTA) or Ethylene Diamine Tetramethylene Phosphonate (EDTMP) and a combination thereof. Further the method can comprise the step of neutralizing or deactivating the complex made between copper ion and carboxylate group. By neutralizing or deactivating it is meant that the complex does not exit or does not provide effect in view of other chemicals components. In a first embodiment, the step of neutralizing is made by converting the complex made between copper ion and carboxylate group to another complex. In a second embodiment, the step of neutralizing is made by changing the oxidation number of the copper ions.

BRIEF DESCRIPTION OF THE DRAWINGS

Further embodiments of the present invention can be understood with the appended drawings.

DETAILED DESCRIPTION

The present invention relates to chemical additives for retarding and inducing the setting of cement slurry. The copper complexes can function as an efficient retarder along or as retarder aid to further increase the effectiveness of some organic retarders. For example, the combination of copper and carboxylate-based retarders like gluconate, glucoheptonate, EDTA or EDTMP has a powerful effect on retardation. The experimental results are shown on Table 1.

TABLE 1

Experimental results showing influence of copper on retarder of cementitious compositions

|  | Test number | | |
| --- | --- | --- | --- |
|  | A1 | A2 | A3 |
| Portland Class G | 100% | 100% | 100% |
| Anti foam mL/kg [gal/sk] | 2 [0.05] | 2 [0.05] | 2 [0.05] |
| Retarder (% BWOC) | 0.24 | — | 0.24 |
| Copper (II) (% BWOC) | — | 0.47 | 0.47 |
| 95 Bc | 6:48 | 17:32 | — |

Figure 1A:
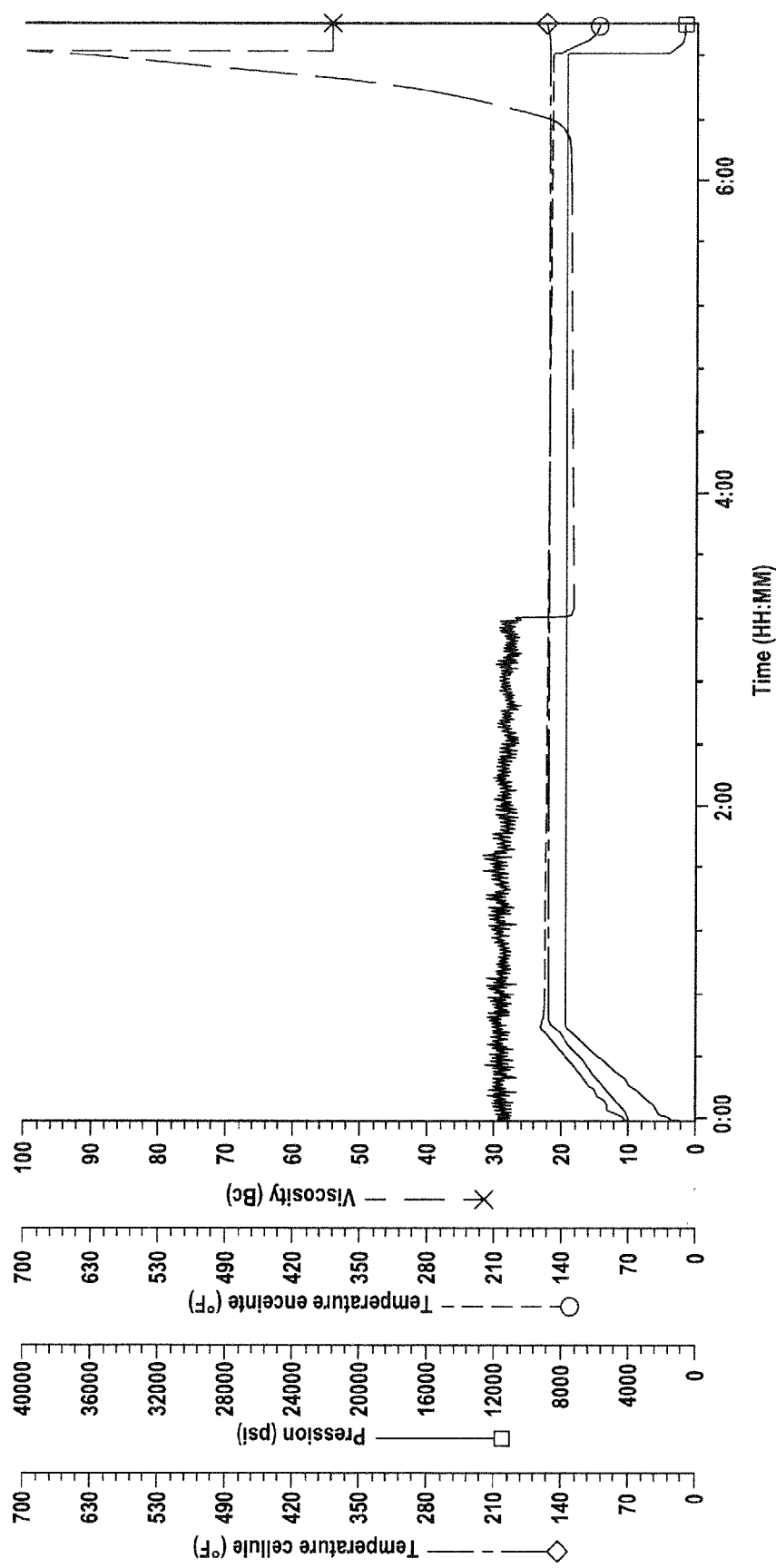
FIG. 1A shows a graph of the thickening time of a cementitious cement with a conventional retarder at 65.5° C. (150° F.).
Figure 1B:
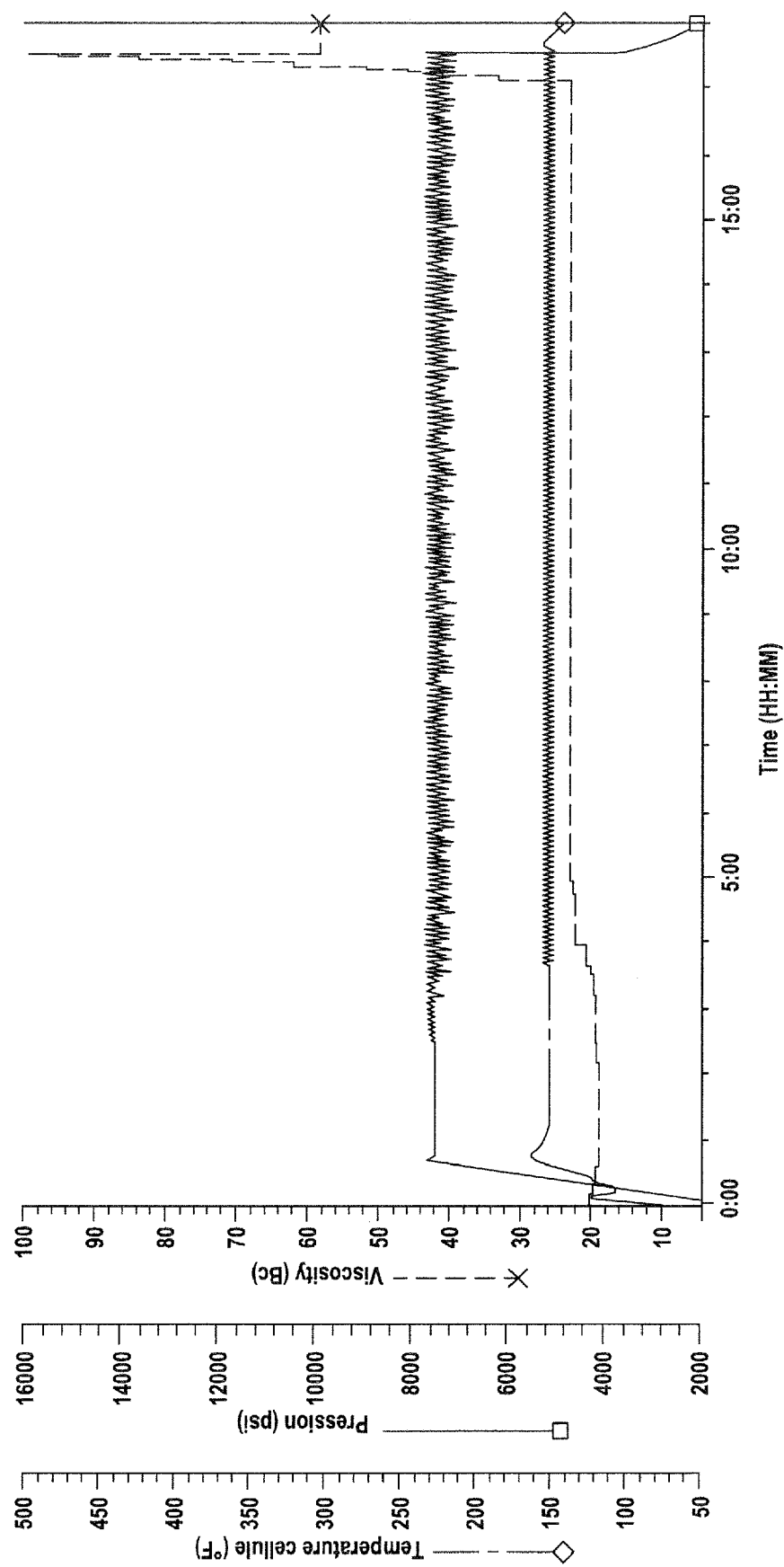
FIG. 1B shows a graph of the thickening time of a cementitious cement with a copper complex at 65.5° C. (150° F.).
Figure 1C:
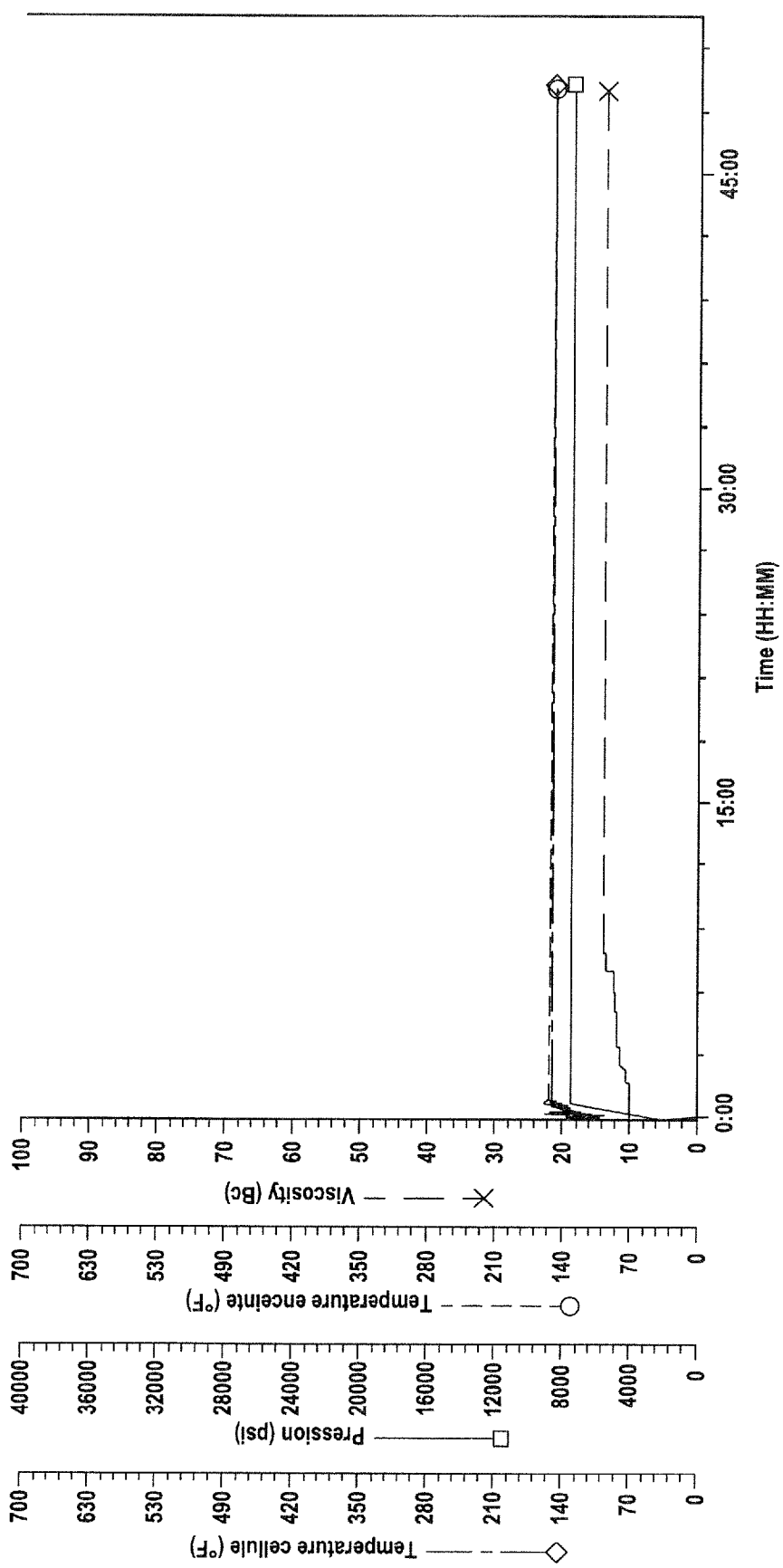
FIG. 1C shows a graph of the thickening time of a cementitious cement according to the invention at 65.5° F. (150° F.).

The base design of the cementitious composition is a 18.89 g/cm$^3$ (15.8 ppg) Portland cement slurry type G with an antifoam agent at the concentration of 2 mL/kg (0.05 gal/sk). The slurry is prepared following API procedure and copper was put in the waring blender fives minutes after API mixing. Then the slurry was mixed 1 min at 4000 rpm. Those experimental results at 65.5° C. (150° F.) demonstrate that copper has a synergetic effect with retarder i.e. copper II has a retarding effect on cement. Copper II in a base environment form a precipitate with hydroxide. FIG. 1A shows the thickening time of the cementitious composition A1 where the retarder is present alone. FIG. 1B shows the thickening time of the cementitious composition A2 where the copper is present alone without the retarder. And FIG. 1C shows the thickening time of the cementitious composition A3 where the copper and the retarder are both present. As it can be shown on FIG. 1C, the thickening time of the cementitious composition is significantly postponed. It is believed that copper complex the carboxylate groups of retarder and increase so power of the retarder.

The amount of set retarder can vary, depending on the type of cementitious material, the type of set retarder selected and the desired storage time. The term "BWOC" refers to by weight of the cementitious material. For slag cements and hydraulic cements, typical amounts of gluconates and glucoheptonates range from about 0.1% to about 5% BWOC, preferably from about 0.2% to about 1% BWOC, with about 0.5% BWOC of calcium gluconate especially preferred. For slags, typical amounts of gluconates and glucoheptonates range from 0% to about 3% BWOC, with about 0.1% to about 0.4% BWOC of sodium glucoheptonate especially preferred.

In another aspect of the invention and generally focused on storable cement, a method to induce the setting of cement slurries is proposed. The cementitious compositions are retarded by methods described above. And the trigger to induce the setting can be chemical or physical in nature. For example, upon inducing, the copper complexes are converted to different complexes or oxidation states and then are rendered ineffective. So, for the case of using copper as a retarder aid, the thickening time is still controlled by the organic retarder. In this way, it is proposed to use a triggering to deactivate the copper ions and then induce the cement setting on demand.

Accordingly, the cementitious material can be used for storable cement. The cement can comprises further additive as for example suspending agent. Because the cementitious material may separate during storage due to reduced interparticle interactions when compared with normal cement slurries, adding a suspending agent maintains the slurry with minimal separation of the cementitious material. Certain types of suspending agents of the type used in the drilling mud industry can be used for the purposes of the present invention. These suspending agents include polymers, clays, emulsions, transition metal oxides and hydroxides, and the like. While some particle separation can still occur over time, routine agitation redisperses the separated particles and rehomogenizes the slurry during storage.

The storable cementitious composition shows excellent storage condition. Under normal conditions, the storable slurries of the invention have considerable longevity. The storable slurry of the invention should remain stable as a liquid, preferably for about a week and more preferably about two to three months without setting. In some cases, storage times in excess of six months will be achieved. Changes in thickening time of the activated hydraulic cement slurries, even after prolonged storage of the nonactivated slurry, are not excessive and such changes are readily determined using techniques known in the art.

At the time of cementing, the stored slurry is activated, pumped into the well and allowed to set. Activation occurs by adding an activator which can be chemical or physical in nature as said. The activator will deactivate the complex made between the retarder and the copper and allows the slurry to set after a predetermined pumping time which will be controlled through the conventional organic retarder. In another embodiment, the activation can be made downhole by releasing the needed chemical directly in the well or activating physically (e.g. UV radiation, heating) the slurry.

The invention claimed is:

1. A method to retard cementitious composition for oilfield application comprising the unique double step of adding an organic retarder having at least one carboxylate group and adding copper ions such that a complex is made between copper ion and carboxylate group.

2. The method of claim 1, further comprising the step of neutralizing the complex made between copper ion and carboxylate group.

3. The method of claim 2, wherein the step of neutralizing is made by converting the complex made between copper ion and carboxylate group to another complex.

4. The method of claim 2, wherein the step of neutralizing is made by changing the oxidation number of the copper ions.

* * * * *